United States Patent [19]

Nakamura

[11] 3,832,529

[45] Aug. 27, 1974

[54] READING SYSTEM FOR TAGS ENCODED WITH BARS OF DIFFERENT WIDTHS

[75] Inventor: Koichi Nakamura, Suwa, Japan

[73] Assignee: Kabushiki Kaisha Seiwa Seikosha, Tokyo, Japan

[22] Filed: May 7, 1973

[21] Appl. No.: 358,121

[52] U.S. Cl. .......................... 235/61.11 E, 250/268

[51] Int. Cl. .......................... G06k 7/10, G08c 9/06

[58] Field of Search .............. 235/61.11 E, 61.11 R; 250/555, 567, 568

[56] References Cited

UNITED STATES PATENTS

| | | | |
|---|---|---|---|
| 3,684,866 | 8/1972 | Jones | 235/61.11 E |
| 3,727,030 | 4/1973 | McMurtry | 235/61.11 E |
| 3,766,364 | 10/1973 | Krecioch | 235/61.11 E |

*Primary Examiner*—Daryl W. Cook

*Attorney, Agent, or Firm*—Waters, Roditi, Schwartz & Nissen

[57] ABSTRACT

A device for reading information encoded in the form of bars of two widths. The device comprises an illuminating section for illuminating the bars and concentric detecting sections corresponding respectively in width to the width of the aforementioned bars. The detectors are physically related to the illuminating portion to detect the illumination of the bars thereby. The detectors may be optical fiber bundles. The innermost of the detectors is preferably columnar. A method of the invention consists of translating a row of bars of different widths into information bits by scanning the bars to illuminate the same and to pick up reflected light with two associated light detectors, the widths of which correspond, as noted above, to the width of the bars. The picked up light by the detectors is converted into electrical pulses, the magnitude of which is limited to form rectangular pulses of width corresponding to the aforesaid bars. The magnitude of the pulses generated by the wider detector is detected to generate pulses correponding only to the wider bars. The latter pulses are terminated in synchronism with the corresponding rectangular pulses. The bars are preferably made of one color.

7 Claims, 15 Drawing Figures

READING SYSTEM FOR TAGS ENCODED WITH BARS OF DIFFERENT WIDTHS

FIELD OF INVENTION

This invention relates to reading systems for tags of the type which shows a price or the kind of a commodity and which is attached to a commodity sold at a retail shop such as a department store or a supermarket or the like.

More particularly, this invention relates to a reading system which includes a reading device for a tag, which reading device applies irradiated light to tags and detects whether there is any printed information on the tags by utilizing the reflected light.

BACKGROUND

Conventionally, fountain pen shaped devices utilizing optical fibers are known for use as reading devices. By such devices, information such as commodity price encoded on tags can be sent directly to a cash register by passing the same over the above-mentioned tags.

One specific known reading device works with a code consisting of different colored bars. This type of device necessitates the use of colored printing which is quite expensive and this is unacceptable since it is preferred that the tags attached to commodities be as cheap as possible, inasmuch as they are eventually thrown away. Furthermore, it is expensive to provide a color identifier for reading purposes.

A second known device operates with a code consisting of bars of different widths. However, the detecting device which is known for use with such a code is sensitive to the scanning speed and provides an alarm when the scanning speed deviates from within certain limits. This device imposes a strain on the user thereof, since the user has to be aware of the scanning speed limits. Furthermore, the necessity of providing a speed detector and alarm results in high cost.

Still another known system relates to the use of two parallel rows of code bars requiring the use of two detectors to operate in connection with each of such rows. This type of device is not acceptable since it imposes a strain on the user, since the reading device must be held in oriented position relative to the rows. Furthermore, the related apparatus is expensive and the printing operation is also more expensive than is absolutely necessary.

SUMMARY OF INVENTION

It is an object of the invention to provide an improved device for the reading of information printed, for example, on tags which are attached to various commodities, or the like.

Another object of the invention is to provide an improved method for reading information printed on tags or the like, in the form of bars of different widths.

To achieve the above and other objects of the invention, there is provided a device for reading information encoded in the form of bars of at least two widths, said device comprising illuminating means for illuminating the bars and a plurality of detecting means corresponding respectively in width to the widths of the bars and physically related to the illuminating means to detect the illumination of the bars by the illuminating means.

Preferably, the detecting means are optical fiber bundles.

In accordance with a preferred embodiment of the invention, the detecting means are concentrically arranged. According to a preferred feature of the invention, the innermost of such concentrically arranged detecting means is columnar.

According to the invention, a method is provided for translating a row of bars of first and second widths into information bits. This method comprises scanning the bars to illuminate the same and to pick up reflected light with two associated light detectors, the width of which correspond to the widths of the bars, converting the light picked up by the detectors into electrical pulses, limiting the magnitude of the pulses generated by the narrower detector to form rectangular pulses of widths corresponding to said bars, detecting the magnitude of the pulses generated by the wider detector and exceeding a predetermined magnitude whereby to generate pulses corresponding only to the wider bars, and terminating the latter said pulses in synchronism with the corresponding rectangular pulses.

Preferably, as noted above, the detectors are arranged in concentric relationship. Furthermore, in accordance with the invention, the bars may preferably be made of one color.

The above and other objects and advantages of the invention will be understood more clearly from the detailed description which follows hereinbelow.

BRIEF DESCRIPTION OF DRAWINGS

In the drawing:

FIG. 7(a) shows the code bars, FIGS. 7(b) and (d) show detected pulses of reflected light, FIGS. 7(c) and (e) show the shaped wave forms of the respective pulses, FIG. 7(f) shows the wave forms of a memory means which memorizes the pulses of FIG. 7(e), and FIG. 7(g) shows the timing pulses.

DETAILED DESCRIPTION

Figure 1:
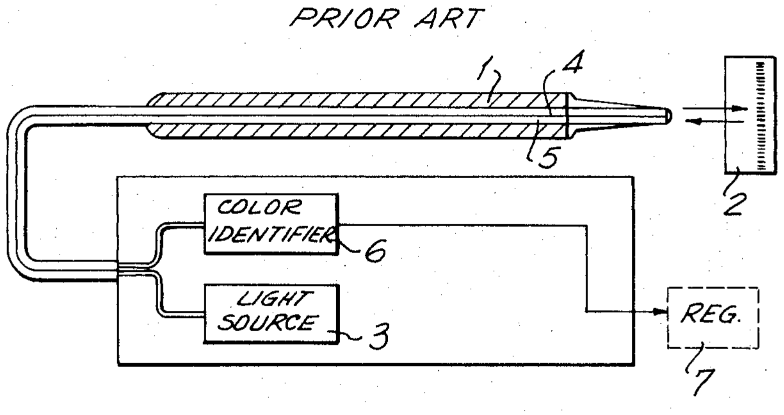
FIG. 1 PRIOR ART
FIG. 1 diagrammatically illustrates a conventional reading system for a tag.

A device of the prior art is shown in FIG. 1. Part 1 is a detecting portion of the reading device which is shaped like a fountain pen. Element 2 is a tag attached to a commodity. On the tag 2, the kind, price, etc. of the commodity is encoded in bar-code.

Figure 2:
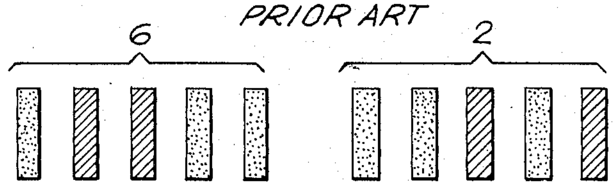
FIG. 2 PRIOR ART
FIG. 2 is an enlarged view of the code on the tag shown in FIG. 1.

FIG. 2 is an enlarged view of the coding on the tag. Bars hatched with oblique lines are green and the bars shown with dots are black. If it is predetermined that green means "1," and black, "0," for example, certain information is given.

In FIG. 1, element 3 is a light source. The tag is irradiated by light led through an optical fiber bundle 4. Reflected light from the tag is led to a color identifier 6 through an optical fiber bundle 5. When the light is black or green, it is known that an information signal has been picked up. Moreover, whether the information is 0 or 1 can be determined from two colors. Element 7 is a cash register.

The method associated with FIGS. 1 and 2 is characterized in that information can be read independently with shopman's scanning speed by use of the fountain pen shaped detecting portion of the reading device. In case a black bar only is printed corresponding to information "1" and the nonexistence thereof means "0," a mistaken reading will result if the shopman's scanning speed is not within a certain range.

A substantial defect of this known method is that the tag attached to a commodity needs color printing. This results in expensive tag. It is necessary that the tag attached to a commodity by as cheap as possible, because it is eventually to be thrown away. Also, it is to be attached to each commodity unit. Furthermore, it is expensive to provide a color identifier for a reading device.

Figure 3:
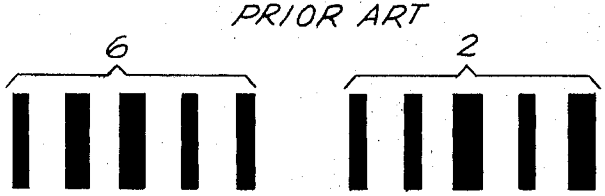
FIG. 3 PRIOR ART
FIGS. 3 and 4 are enlarged views of the coding on tags according to other conventional reading systems for tags.

Various methods are proposed in accordance with the invention to eliminate the above-mentioned defects. FIG. 3 illustrates one embodiment of the invention. Therein information is encoded in a bar-code wherein wide black bars and narrow black bars are interpreted in such a way, for example, that a wide black bar corresponds to a "1" and a narrow black bar corresponds to a "0." Information is read by a reading device provided with a speed detector for comparing the scanning speed with pulse width according to reflected light of the bar-code. The scanning speed has a certain limit in this method and, when there is a deviation from the limit, a buzzer rings to warn the shopman or user.

One defect in the above method is that the shopman has the mental strain of being conscious of the scanning speed. It is not advantageous where data are to be applied one after another to impose such a strain on the user. Moreover, the necessity of a speed detector and a buzzer results in high cost.

Figure 4:
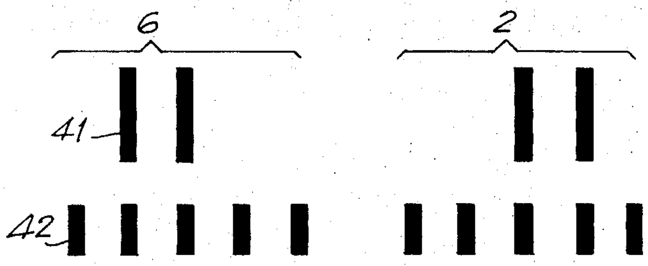
FIG. 4 PRIOR ART

FIG. 4 illustrates another embodiment. Herein is shown a timing-code 42 besides a black bar-code 41. For example, the existence of a black bar at a position corresponding to the timing code means a "1" and the nonexistence thereof means a "0."

Though this method has the advantage that the scanning speed of the shopman has no relation to the reading operation, two detectors must be provided in the fountain pen type detecting portion of the reading device to follow the two rows of bar-codes. Furthermore, each of the two detectors must be set to each of the two kinds of bar-codes of the tag. This imposes a strain on the shopman or user because the fountain pen type detecting portion of the reading device must be held in oriented position in relation to the tag and thus must be held in a limited manner.

The invention also eliminates the defects of the above-mentioned various methods and offers a reading system of a tag which has no dependence on scanning speed, imposes no strain on a shopman or user and is capable of utilizing a cheap tag.

Figure 5:
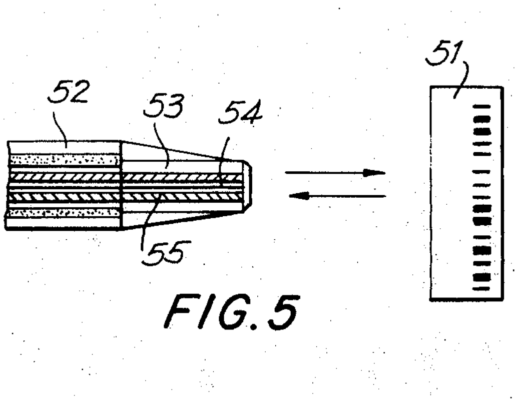
FIG. 5 is a fragmentary diagrammatic view of a reading system for a tag according to one embodiment of this invention.

One embodiment of this invention is shown in FIG. 5 wherein element 51 is a tag whereon information is encoded in a bar-code using a wide black bar and a narrow black bar similarly to FIG. 3. Element 52 is a fountain pen shaped detecting portion of a reading device for a tag and is moved over the tag for scanning purposes by the shopman's hand. Element 53 is an optical fiber bundle for leading in incidental light. Elements 54 and 55 are detecting portions made of optical fibers for picking up reflected lights. Elements 54 and 55 are disposed concentrically in such a way that the detecting portion 54 is columnar and is positioned at the central part of the device. The detecting portion 55 is hollow cylinder and is disposed just outside the detecting portion 54 which it surrounds.

Figure 6A:
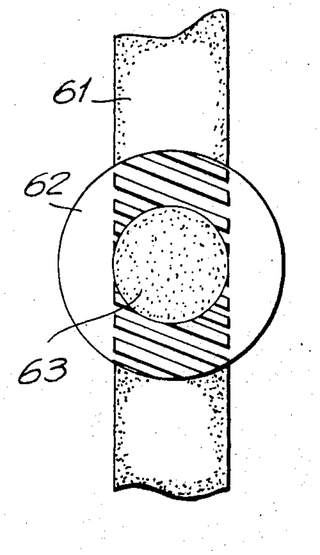
FIGS. 6(a) and 6(b) are enlarged views of the coding on the tag shown in FIG. 5 showing the relation between the optical fiber bundles of the device in FIG. 5 and the code bars.
Figure 6B:
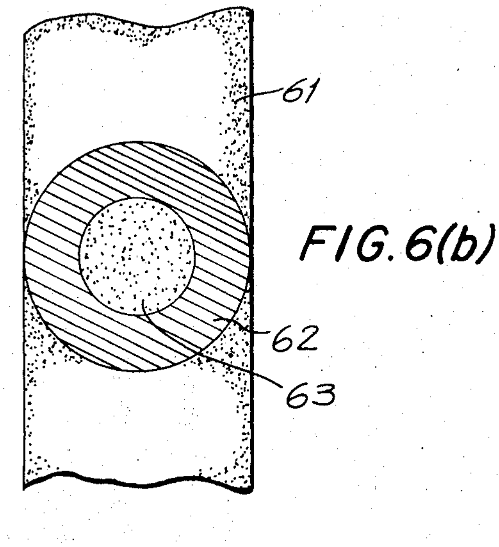

FIG. 6 is an enlarged view of the tag shown in FIG. 5 and shows the relation between this bar-code and the detecting elements. Bars 61 are from the bar-code. Element 62 is an outer detecting portion and element 63 is an inner detecting portion. They are constructed so that width of a narrow bar is almost equal to the diameter of the detecting portion 63 and so that the width of a wide bar is almost equal to the outside diameter of the detecting portion 62.

Figure 7A:
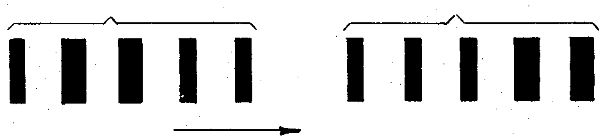
FIGS. 7(a)–(g) show the signals of the tag-reading operation and wherein, more particularly.
Figure 7B:
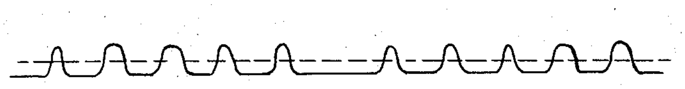
Figure 7C:
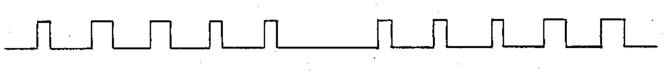
Figure 7D:
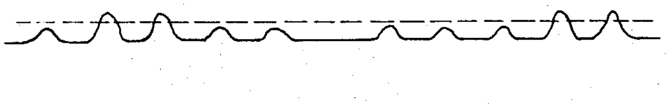
Figure 7E:
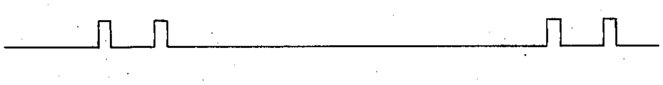
Figure 7F:
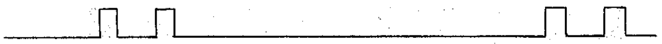
Figure 7G:
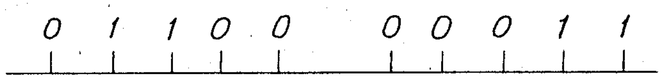
Figure 8:
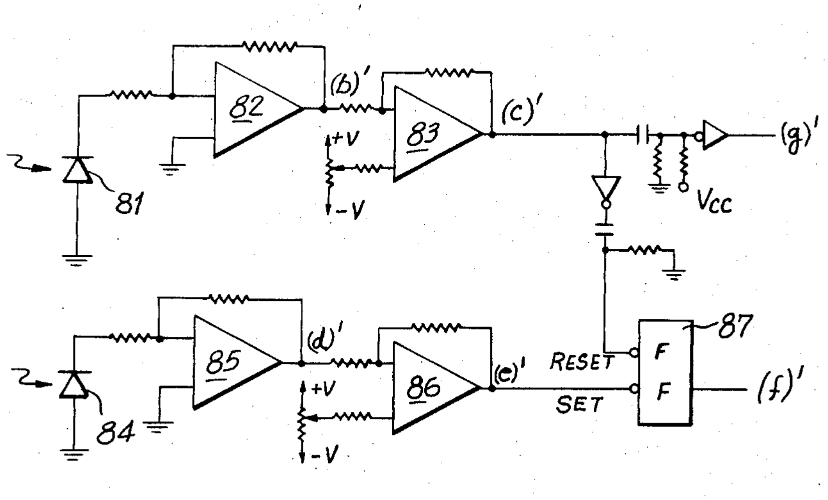
FIG. 8 is a schematic diagram of a circuit whereby the wave forms of FIGS. 7(b)–7(g) are derived from the code bars of FIG. 7(a).

The following is a description of the operation of this latter reading system. A tag encoded in bar-code as shown in FIG. 7(a) is to be read. The encoding method for the tag is the BCD method (Binary Coded Decivel), wherein one numeral is expressed by five bars. The last bit is a parity bit. In the drawing, a "6" is expressed by the first five bars and a "1" is expressed by the next five bars. A wide bar corresponds to a "1" and a narrow bar corresponds to a "0." The shopman sets the fountain pen shaped detecting portion of the reading device to the tag and moves it over the tag as shown by arrow A in the drawing, namely from left to right. FIG. 7(b) shows the pulses detected by the inner detecting portion 63. FIG. 7(c) shows the shaped wave form of the pulses with their parts which exceed a certain level being cut off, for example, but a limiter. The pulses are generated regardless of the width of the bars. FIG. 7(d) shows the pulses detected by the outer detecting portion 62. Large pulses and small pulses are generated corresponding to wide bars and narrow bars respectively. This is effected from a difference between the maximums of reflected light from the narrow bars and wide bars. The size of the pulses depends upon the quantity of reflected light, not upon the quantity of reflected light, not upon scanning speed. This is proved by the fact that a characteristic of an optical electrical element utilized in this kind of reading device depends upon quantity of lights only, not upon variation of quantity of lights. FIG. 7(e) shows the wave form of the detected pulses shaped by setting the level so that a pulse resulting from a narrow bar is cut off and only a pulse from a wide bar can be picked up. If the pulses of FIG. 7(e) are prolonged to have the same trailing edges as the pulses of FIG. 7(c) by a memory means which is constructed to be set at the leading edges of the pulses of FIG. 7(e) and to be reset at the trailing edges of the pulses of FIG. 7(c), the pulses will be as shown in FIG. 7(f). Timing pulses for detecting the existence of information utilize the trailing edges of the pulses of FIG. 7(c), and decipher a "1" when the memory means used for FIG. 7(f) is set at their trailing edges and decipher "0" when the memory means isn't set then. The result is shown in FIG. 7(g) wherein it is understood that the information encoded by the bar-code of FIG. 7(a) is regenerated.

Light led by the inner detecting portion are irradiated at an optical electrical element 81 and are amplified by an amplifier 82 so that they generate the pulses shown in FIG. 7(b) at point (b)'. These pulses are shaped by a comparator 83, and shaped pulses as shown in FIG. 7(c) are generated at point (c)'. A flip-flop circuit 87 is reset by the differential wave forms of these pulses. These differential wave forms are clock pulses, and the wave forms generated at the point (g)' correspond to FIG. 7(g).

Light led by the outer detecting portion of the tag reader are irradiated at an optical electrical element 84 and are amplified by an amplifier 85 so that they generate the pulses shown in FIG. 7(d) at point (d)'. These pulses are shaped by a comparator 86, and the shaped pulses as shown in FIG. 7(e) are generated at point (e)'. The flip-flop circuit 87 is set at the rising time of these pulses. The output of the flip-flop circuit 87 is the data, and the wave forms at the point (f)' are shown in FIG. 7(f).

This invention is characterized in that the operation of the reading device does not depend upon a shopman's manner of holding of the device due to the use of a structure wherein the inner detecting portion is columnar and the outer detecting portion is a hollow cylinder disposed concentrically with the inner detecting portion and surrounds it. Thus, the shopman need not take extra care to hold the detecting portion of the reading device in a particular manner relative to a tag.

Other than the above-mentioned embodiment where a wide bar and a narrow bar are used, more kinds of bars possessed of more variations in width may be used. They can be read by providing more detecting portions and combining the detected pulses.

As mentioned above, this invention has remarkable results such as independence of operation of the device relative to scanning speed of the reader, no imposition of strain on the user and the possibility of using a unicolor printing and thus a cheap tag.

What is claimed is:

1. A device for reading information encoded in the form of bars of at least two widths, said device comprising illuminating means for illuminating the bars, and a plurality of detecting means corresponding respectively in width to the widths of the bars and physically related to said illuminating means to detect the illumination of the bars by the illuminating means.

2. A device as claimed in claim 1 wherein at least one of said means is an optical fiber bundle.

3. A device as claimed in claim 1 wherein the detecting means are concentrically arranged.

4. A device as claimed in claim 3 wherein the innermost of the detecting means is columnar.

5. A method for translating a row of bars of first and second widths into information bits, said method comprising scanning the bars to illuminate the same and to pick up reflected light with two associated light detectors the widths of which correspond to the widths of the bars converting the light picked up by the detectors into electrical pulses, limiting the magnitude of the pulses generated by the narrower detector to form rectangular pulses of widths corresponding to said bars, detecting the magnitude of the pulses generated by the wider detector and exceeding a predetermined magnitude whereby to generate pulses corresponding only to the wider bars, and terminating the latter said pulses in synchronism with the corresponding rectangular pulses.

6. A method as claimed in claim 5 comprising arranging the detectors in concentric relation.

7. A method as claimed in claim 6 comprising making the bars of one color.

* * * * *